(12) United States Patent
Yamaguchi et al.

(10) Patent No.: US 10,345,527 B2
(45) Date of Patent: Jul. 9, 2019

(54) HOLDER AND OPTICAL FIBER PROCESSING METHOD

(71) Applicants: FUJIKURA LTD., Tokyo (JP); NIPPON TELEGRAPH AND TELEPHONE CORPORATION, Tokyo (JP)

(72) Inventors: Takashi Yamaguchi, Chiba (JP); Kunihiko Fujiwara, Chiba (JP); Yuji Aoyagi, Tokyo (JP); Katsushi Nakayachi, Tokyo (JP); Keisuke Yoneda, Tokyo (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/780,220

(22) PCT Filed: Jan. 19, 2017

(86) PCT No.: PCT/JP2017/001806
§ 371 (c)(1),
(2) Date: May 30, 2018

(87) PCT Pub. No.: WO2017/126628
PCT Pub. Date: Jul. 27, 2017

(65) Prior Publication Data
US 2018/0348441 A1    Dec. 6, 2018

(30) Foreign Application Priority Data
Jan. 22, 2016    (JP) .................................. 2016-010626

(51) Int. Cl.
G02B 6/36    (2006.01)
G02B 6/24    (2006.01)
(Continued)

(52) U.S. Cl.
CPC ............ *G02B 6/3616* (2013.01); *G02B 6/24* (2013.01); *G02B 6/245* (2013.01); *G02B 6/25* (2013.01);
(Continued)

(58) Field of Classification Search
None
See application file for complete search history.

(56) References Cited

U.S. PATENT DOCUMENTS 5,024,363 A    6/1991  Suda et al.
5,963,699 A *  10/1999 Tanaka ................. G02B 6/3806
                                                                  385/65
(Continued)

FOREIGN PATENT DOCUMENTS

CN    102854578 B    1/2016
JP    H01-126601 A    5/1989
(Continued)

OTHER PUBLICATIONS

Taiwan IPO Office Action for corresponding Patent Application No. 106102194 dated Sep. 28, 2017 (10 pages).

*Primary Examiner* — Sung H Pak
(74) *Attorney, Agent, or Firm* — Osha Liang LLP (57) ABSTRACT

A holder includes a base including a reference surface and a slider to which an optical-fiber retainer that retains an optical-fiber can be attached. The slider is movable in a front-rear direction with respect to the base, and at least a portion of the optical-fiber retainer is accommodated between the reference surface and the slider when the optical-fiber retainer is attached to the slider and the optical-fiber retainer is positioned with respect to the reference surface by moving the slider toward a reference surface side.

9 Claims, 6 Drawing Sheets

(51) Int. Cl.
*G02B 6/245* (2006.01)
*G02B 6/25* (2006.01)
*G02B 6/255* (2006.01)

(52) U.S. Cl.
CPC ......... *G02B 6/2553* (2013.01); *G02B 6/2556* (2013.01); *G02B 6/3636* (2013.01)

(56) References Cited

U.S. PATENT DOCUMENTS

| | | | |
|---|---|---|---|
| 10,139,568 B2 * | 11/2018 | Yamaguchi | G02B 6/3802 |
| 2006/0153515 A1 * | 7/2006 | Honma | G02B 6/3802 385/134 |
| 2016/0011378 A1 * | 1/2016 | Yamaguchi | G02B 6/3802 65/407 |

FOREIGN PATENT DOCUMENTS

| | | |
|---|---|---|
| JP | 2006-178289 A | 7/2006 |
| JP | 2007-156331 A | 6/2007 |
| JP | 2008-180957 A | 8/2008 |
| JP | 2010-231095 A | 10/2010 |
| JP | 2014-211608 A | 11/2014 |
| JP | 2014-219517 A | 11/2014 |
| JP | 2015-025973 A | 2/2015 |
| TW | I506320 B | 11/2015 |
| WO | 2010/104133 A1 | 9/2010 |

* cited by examiner

HOLDER AND OPTICAL FIBER PROCESSING METHOD

TECHNICAL FIELD

The present invention relates to a holder and an optical fiber processing method.

BACKGROUND

A field-installable optical connector is a known example of a device for connecting optical fibers by abutting the optical fibers' respective end surfaces against one another. The field-installable optical connector is a type of optical connector having a structure that can be easily assembled to a terminal of an optical cable at an optical fiber laying site. A built-in fiber is factory-preinstalled in a ferrule of an optical connector before assembly, and an end section of the built-in fiber is arranged in a clamp section (mechanical splice). At the site of assembly, an end section of an insertion fiber that is retained by an optical-fiber retaining element is inserted into the clamp section, and the optical fibers abut against one another and are connected inside the clamp section.

Patent Literatures 1 and 2 describe structures of gripping members serving as optical-fiber retaining elements. The gripping members described in Patent Literatures 1 and 2 have projections formed on respective inner surfaces of a pair of side walls, and the projections are wedged into an outer sheath of an optical cable (e.g., an indoor cable), to grip and fix the optical cable between the pair of side walls. Patent Literatures 1 and 2 also describe assembling a field-installable optical connector by using the gripping member (optical-fiber retaining element) retaining the optical fiber.

Patent Literature 3 describes an optical fiber jig for retaining an optical fiber. A jig body of the optical fiber jig of Patent Literature 3 includes a pair of side walls standing up from a bottom wall. An optical fiber is arranged in a fiber accommodation groove between the pair of side walls. By moving a slider and thereby elastically deforming the pair of side walls inwardly so as to reduce the width of the fiber accommodation groove, the optical fiber is tucked between and fixed by the fiber accommodation groove between the pair of side walls. Patent Literature 3 also describes assembling a field-installable optical connector by using the optical fiber jig retaining the optical fiber.

Before inserting an optical fiber (insertion fiber) retained by an optical-fiber retaining element into a clamp section of a field-installable optical connector, a pre-treatment is performed, wherein a cover of the optical fiber projecting from the optical-fiber retaining element is removed to expose bare fiber, and an end section of the optical fiber (bare fiber) is cut. In this way, the projection length of the optical fiber (insertion fiber) projecting from the optical-fiber retaining element and also the cover-removal length are adjusted respectively to predetermined lengths.

Patent Literature 2 describes: arranging a gripping member that grips an optical cable into an optical fiber holder; placing the optical fiber holder, to which the optical cable has been fixed, on an optical fiber processing tool (a fiber cutter or cover-removal tool); and cutting the optical fiber or removing the cover of the optical fiber.

Also, Patent Literature 3 describes: mounting an optical fiber jig (optical-fiber retaining element) retaining an optical fiber onto a holder; placing the holder, to which the optical fiber has been fixed, on an optical fiber processing tool (a cover-removal tool or cutter); and removing the cover of the optical fiber or cutting the optical fiber.

PATENT LITERATURE

Patent Literature 1: JP 2010-231095A
Patent Literature 2: JP 2006-178289A
Patent Literature 3: JP 2007-156331A Optical-fiber retaining elements for retaining optical fibers come in various shapes, like the gripping members disclosed in Patent Literatures 1 and 2 and the optical fiber jig disclosed in Patent Literature 3. Preparing dedicated holders conforming to the various optical-fiber retaining elements having different shapes increases the types of holders. On the other hand, if the holder's accommodation section is simply widened to be able to accommodate various optical-fiber retaining elements with varying shapes, the posture of the optical-fiber retaining element attached to the holder may become unstable, and thus optical fiber processing precision may deteriorate.

SUMMARY

One or more embodiments of the invention stably attach optical-fiber retainers having different shapes to a holder.

One or more embodiments of the invention are directed to a holder to which an optical-fiber retainer for retaining an optical fiber can be attached. According to one or more embodiments, the holder includes: a base including a reference surface; and a slider to which the optical-fiber retainer can be attached, the slider being constructed so as to be movable in a front-rear direction with respect to the base. At least a portion of the optical-fiber retainer can be accommodated between the reference surface and the slider in a state where the optical-fiber retainer is positioned with respect to the reference surface by moving the slider toward the reference surface side in a state where the optical-fiber retainer is attached to the slider.

Other features of one or more embodiments of the invention are disclosed in the following description and the drawings.

With one or more embodiments of this invention, optical-fiber retainers having different shapes can be attached stably to a holder.

DETAILED DESCRIPTION

The following description and the drawings reveal at least the following features of one or more embodiments of the invention.

Disclosed is a holder in accordance with one or more embodiments to which an optical-fiber retainer for retaining an optical fiber can be attached, the holder including: a base including a reference surface; and a slider to which the optical-fiber retainer can be attached, the slider being constructed so as to be movable in a front-rear direction with respect to the base. At least a portion of the optical-fiber retainer can be accommodated between the reference surface and the slider in a state where the optical-fiber retainer is positioned with respect to the reference surface by moving the slider toward the reference surface side in a state where the optical-fiber retainer is attached to the slider. With this holder, optical-fiber retainers having different shapes can be attached stably to the holder.

According to one or more embodiments, the holder further includes a latch that retains a position of the slider with respect to the base. In this way, it is possible to maintain a state where the optical-fiber retainer is positioned with respect to the reference surface of the base.

According to one or more embodiments: the latch includes a base-side latch section provided to the base, and a slider-side latch section provided to the slider; and one of the base-side latch section and the slider-side latch section includes a plurality of notches lined up in the front-rear direction, and the other includes a catch, the catch being caught by one of the notches to thereby retain the position of the slider in the front-rear direction with respect to the base. In this way, it is possible to maintain a state where the optical-fiber retainer is positioned with respect to the reference surface of the base.

According to one or more embodiments: the slider includes a pincher; and the pincher is constructed such that a pinched member that is pinched by the pincher is permitted to move toward the reference surface side but is inhibited from moving toward an opposite side. This construction is particularly advantageous in cases where the position of the slider retained by the latch is discrete.

According to one or more embodiments: the pincher includes a pair of elastic pieces provided so as to project inwardly from respective inner surfaces of a pair of side walls; and each of the elastic pieces is arranged in an inclined manner such that a tip-end of the elastic piece is located more toward the reference surface side than a base-end thereof. In this way, a pinched member can be permitted to move toward the reference surface side while being able to inhibit the pinched member from moving toward the opposite side.

According to one or more embodiments, the pincher includes a plurality of pairs of the elastic pieces. In this way, force applied to the pinched member can be dispersed.

According to one or more embodiments, the holder further includes a latch release that releases a latched state created by the latch. In this way, the position of the slider with respect to the base becomes adjustable, even when the latch firmly retains the position of the slider with respect to the base.

Disclosed is an optical fiber processing method in accordance with one or more embodiments involving: preparing a holder that includes a base including a reference surface, and a slider constructed so as to be movable in a front-rear direction with respect to the base; attaching, to the slider, an optical-fiber retainer that retains an optical fiber; moving the slider toward the reference surface side in a state where the optical-fiber retainer is attached to the slider, to thereby position the optical-fiber retainer with respect to the reference surface; and setting, to an optical fiber processing tool, the holder that accommodates at least a portion of the optical-fiber retainer between the reference surface and the slider, and processing the optical fiber. In this way, optical-fiber retainers having different shapes can be attached stably to the holder, and thus, optical fiber processing precision can be improved.

{Holder 20}

Figure 1A:
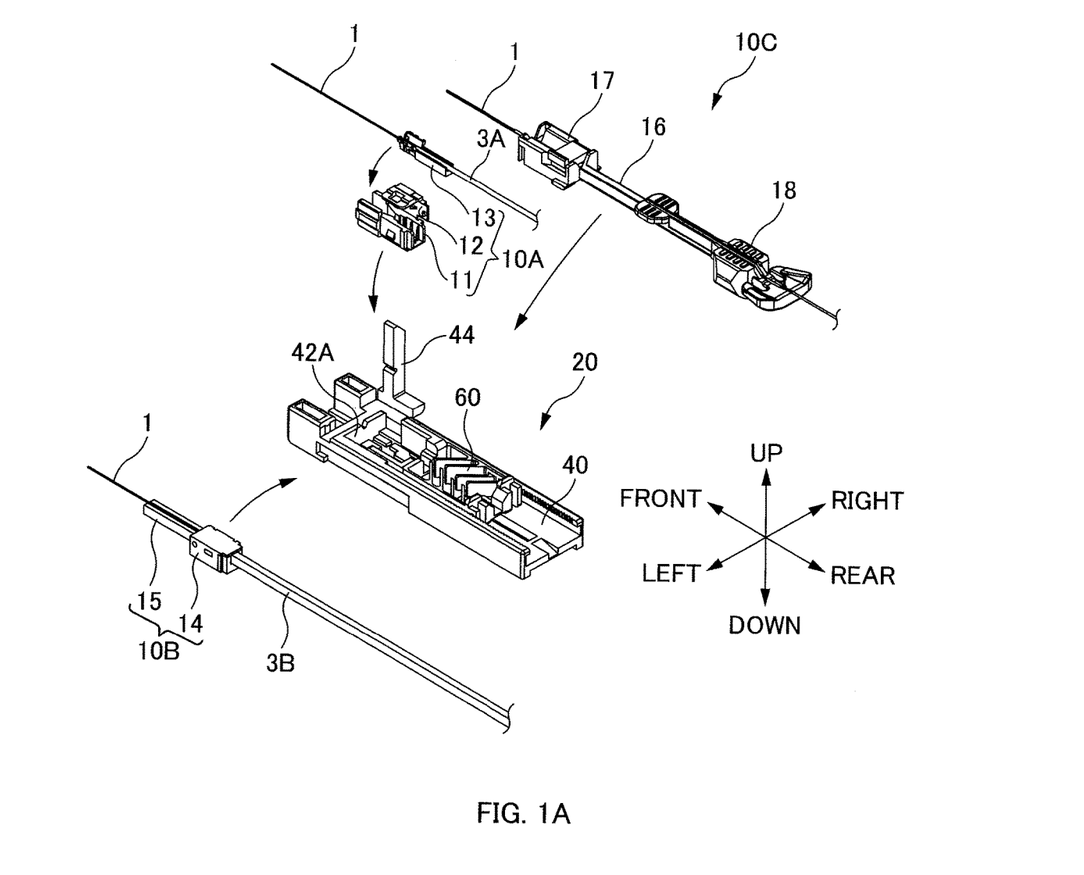
FIG. 1A is a diagram illustrating how an optical-fiber retainer 10 is attached a holder 20 according to one or more embodiments.
Figure 1B:
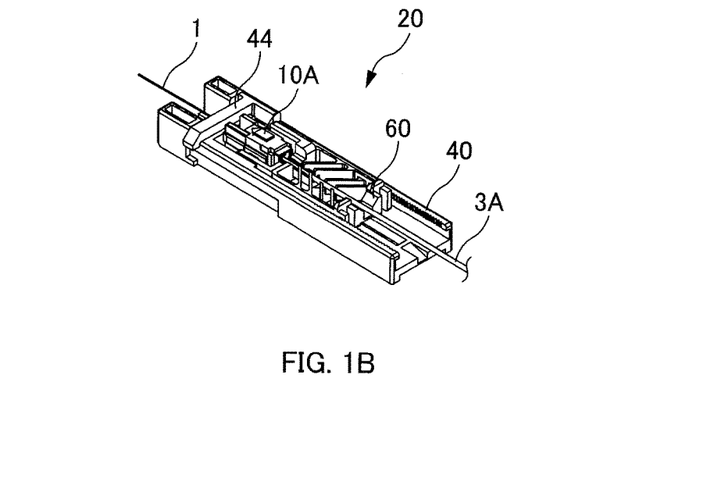
FIG. 1B is a diagram illustrating a state in which a first optical-fiber retainer 10A is attached to the holder 20 according to one or more embodiments.

FIG. 1A is a diagram illustrating how an optical-fiber retainer 10 is attached to a holder 20 according to one or more embodiments. FIG. 1B is a diagram illustrating a state in which a first optical-fiber retainer 10A is attached to the holder 20 according to one or more embodiments.

In the following description, various directions are defined as illustrated in the figures. The optical axis direction of an optical fiber 1 is referred to as the "front-rear direction", the end section side of the optical fiber 1 is the "front", and the opposite side is the "rear". The direction perpendicular to a bottom surface 411 (the surface to be placed on a mounting base of an optical fiber processing tool) of the holder 20 is referred to as the "up-down direction", the side from which an optical-fiber retainer 10 is attached as viewed from the holder 20 is "up", and the opposite side (the side toward which the holder 20's bottom surface 411 faces) is "down". The direction perpendicular to the front-rear direction and the left-right direction is referred to as the "left-right direction", the right-hand side as viewed from rear to front is the "right", and the left-hand side is the "left". The left-right direction is also referred to as the width direction.

This holder 20 is a jig that can be set on an optical fiber processing tool (such as a fiber cutter or a cover-removal tool) in a state where an optical-fiber retainer 10 retaining an optical fiber 1 is attached. By attaching the optical-fiber retainer 10 to the holder 20, the optical-fiber retainer 10 and the optical fiber 1 can be positioned with respect to the optical fiber processing tool.

FIG. 1A illustrates three types of optical-fiber retainers 10 according to one or more embodiments.

A first optical-fiber retainer 10A is a gripping member (outer sheath gripping member) disclosed in Patent Literature 1 (JP 2010-231095A) described above. This gripping member has projections formed on respective inner surfaces of a pair of side walls of a main body section 11, and the projections are wedged into an outer sheath of a square optical cable (e.g., an indoor cable), thereby being able to grip and fix the square optical cable. Herein, however, the first optical-fiber retainer 10A grips and fixes a 0.9-mm-dia. round optical cable 3A via an attachment 13, instead of an indoor cable. A rear section of the attachment 13 has a U-shaped cross-sectional shape and accommodates the round optical cable 3A, with the round optical cable 3A extending out from the rear side. A front section of the attachment 13 has a V-shaped cross-sectional shape. When the front section of the attachment 13 is accommodated in the main body section 11 of the gripping member, the pair of V-shaped side walls of the attachment 13 is pressed by the projections of the main body section 11 and elastically deforms inwardly, thereby gripping the outer sheath of the round optical cable 3A. A lid 12 is closed after attaching the attachment 13 to the main body section 11 of the gripping member, and thus, the round optical cable 3A is gripped and fixed by the first optical-fiber retainer 10A. An optical fiber 1 stripped and exposed from the round optical cable 3A extends out from the front side of the first optical-fiber retainer 10A.

A second optical-fiber retainer 10B is another gripping member (outer sheath gripping member) that grips an outer sheath of a square optical cable 3B (e.g., an indoor cable). A rear section 14 of the second optical-fiber retainer 10B has substantially the same shape as the first optical-fiber retainer 10A. A lid is closed in a state where the outer sheath of the square optical cable 3B is gripped by a main body, and thereby the square optical cable 3B is gripped and fixed. A front section 15 of the second optical-fiber retainer 10B is provided with a fiber insertion section having a U-shaped cross-sectional shape in which a fiber accommodation groove is formed between a pair of side walls. Thus, the length, in the front-rear direction, of the second optical-fiber retainer 10B is longer than that of the first optical-fiber retainer 10A. The square optical cable 3B extends out from the rear side of the second optical-fiber retainer 10B, and an optical fiber 1 stripped and exposed from the square optical cable 3B extends out from the front side thereof.

A third optical-fiber retainer 100 is an optical fiber jig disclosed in Patent Literature 3 (JP 2007-156331A) described above. This optical fiber jig includes a rod-shaped jig body 16, and a fiber holding section 17 provided on the front side of the jig body 16. The jig body 16 includes a pair of side walls standing up from a bottom wall. An optical fiber 1 is arranged in a fiber accommodation groove between the pair of side walls. By moving a slider 18 and thereby elastically deforming the pair of side walls inwardly so as to reduce the width of the fiber accommodation groove, the optical fiber 1 is tucked between and fixed by the fiber accommodation groove between the pair of side walls. The optical fiber 1 extends out from the front and rear of the third optical-fiber retainer 100.

The holder 20 according to one or more embodiments is constructed such that optical-fiber retainers having various shapes can be attached thereto, in addition to the aforementioned optical-fiber retainers 10. The construction of the holder 20 is described below.

Figure 2:
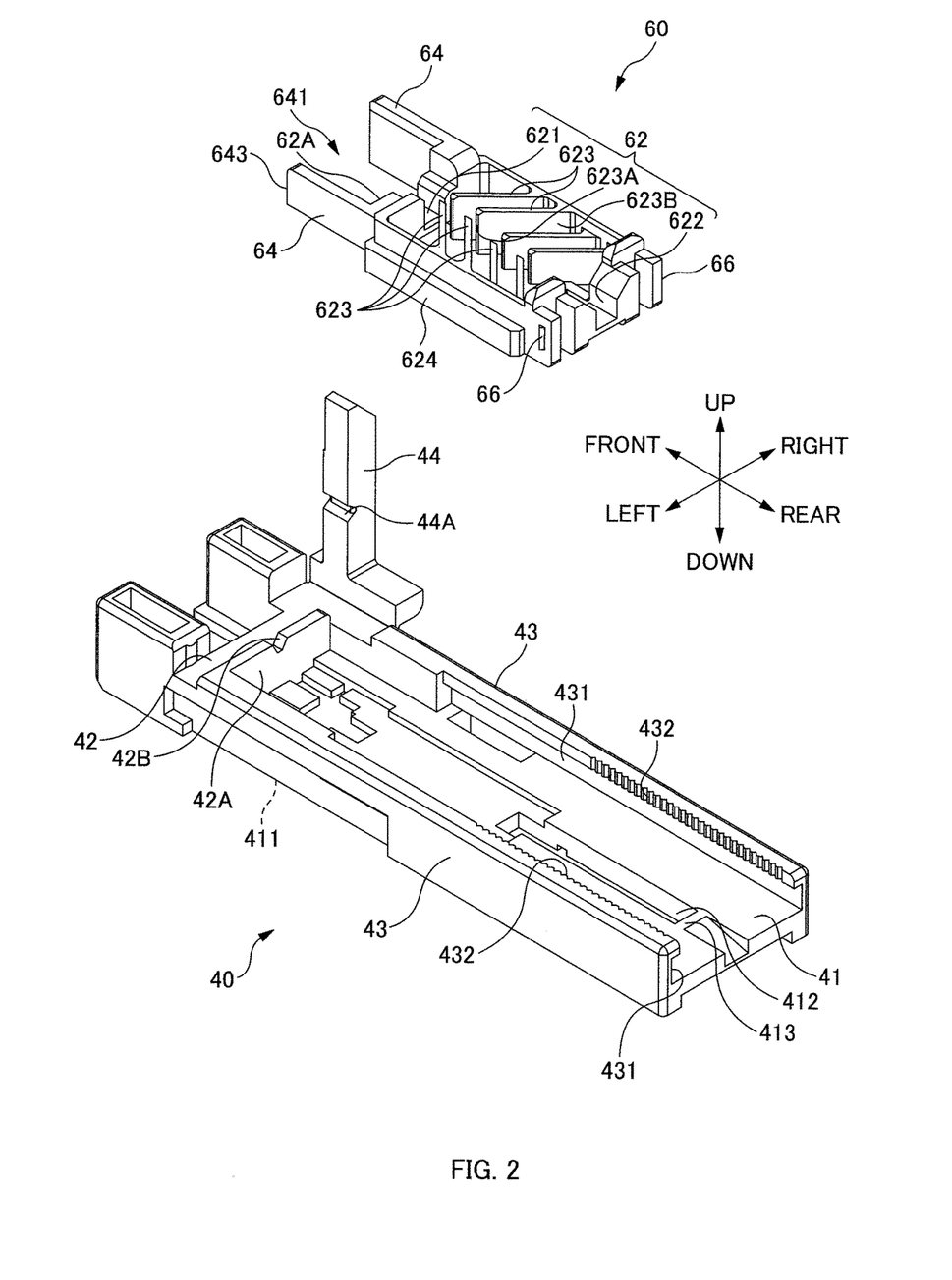
FIG. 2 is an exploded perspective view of the holder 20 according to one or more embodiments.

FIG. 2 is an exploded perspective view of the holder 20 according to one or more embodiments. The holder 20 includes a base 40 and a slider 60.

The base 40 is a section functioning as a jig to be set to an optical fiber processing tool (e.g., a fiber cutter). A bottom surface 411 of the base 40 serves as the surface to be placed on a mounting base of the optical fiber processing tool. In one or more embodiments, the base 40 also serves as a member that retains the slider 60 so as to be movable in the front-rear direction. The base 40 includes a bottom section 41, a front wall section 42, and a pair of side wall sections 43. An optical-fiber retainer 10 (or a portion of an optical-fiber retainer 10) and the slider 60 will be accommodated in a space surrounded by the bottom section 41, the front wall section 42, and the pair of side wall sections 43.

The bottom section 41 is a section constituting the bottom surface 411 of the holder 20, and is also a section constituting a surface for mounting the slider 60. The bottom section 41 is provided with a guide groove 412 and an engagement section 413. The guide groove 412 is a groove formed along the front-rear direction, and guides, in the front-rear direction, a projection (not illustrated) formed on the lower surface of the slider 60. The engagement section 413 is a section that prevents the slider 60 from falling out rearward by engaging with the projection formed on the lower surface of the slider 60, and is formed on the rear side of the guide groove 412.

The front wall section 42 is a wall-shaped section arranged on the front side of the space in which the optical-fiber retainer 10 is accommodated, and is a section for positioning the optical-fiber retainer 10. A surface on the rear side of the front wall section 42 serves as a reference surface 42A, and positioning of the optical-fiber retainer 10 is conducted by contact between the reference surface 42A and a front end of the optical-fiber retainer 10. An upper edge section of the front wall section 42 is provided with a fiber groove 42B through which an optical fiber 1 extending out from the front side of the optical-fiber retainer 10 is passed.

The side wall sections 43 are sections constituting the left and right sides of the holder 20. When the holder 20 is set to an optical fiber processing tool, the side wall sections 43 function to position the holder 20 with respect to the optical fiber processing tool in the left-right direction. The slider 60 is arranged between the pair of side wall sections 43.

In the inner surface of each side wall section 43, a guide groove 431 is formed along the front-rear direction. The guide grooves 431 are sections that guide the slider 60 in the front-rear direction, and that prevent the slider 60 from falling out upward.

The side wall sections 43 respectively have base-side latch sections 432. The base-side latch sections 432 are sections for retaining the position of the slider 60 in the front-rear direction, and are sections constituting a latch together with slider-side latch sections 66. Herein, each base-side latch section 432 is constituted by a multitude of notches (cutouts) lined up continuously in the front-rear direction.

The base 40 further includes a fiber holding section 44. The fiber holding section 44 is a member that holds down an optical fiber 1 extending out from the front side of an optical-fiber retainer 10. The fiber holding section 44 is openable and closable. When the fiber holding section 44 is open, an optical fiber 1 can be placed in the fiber groove 42B in the front wall section 42. When the fiber holding section 44 is closed, the optical fiber 1 passed through the fiber groove 42B in the front wall section 42 is sandwiched between the front wall section 42 and the fiber holding section 44, and thereby movement of the optical fiber 1 is restricted. A groove 44A for letting an optical fiber 1 pass through is formed in the fiber holding section 44.

The slider 60 is a member for attaching an optical-fiber retainer 10, and is a member that is movable in the front-rear direction with respect to the base 40. An optical-fiber retainer 10 can be directly or indirectly attached to the slider 60, for example, by the slider 60 retaining a portion of the optical-fiber retainer 10 or by the slider 60 retaining an optical cable extending out from the optical-fiber retainer 10 (for example, the square optical cable 3B extending out from the rear side of the second optical-fiber retainer 10B). Since the slider 60 is movable in the front-rear direction, by moving the slider 60 toward the front side in a state where the optical-fiber retainer 10 is attached thereto, the optical-fiber retainer 10 can be positioned with respect to the reference surface 42A of the base 40. Further, since the slider 60 is movable in the front-rear direction, the length, in the front-rear direction, of the space for accommodating an optical-fiber retainer 10 can be adjusted, and thus, optical-fiber retainers 10 having various shapes can be attached in a positioned state.

The slider 60 includes a main body section 62, front-side extension sections 64, and slider-side latch sections 66.

The main body section 62 is a section that is guided by the base 40 along the front-rear direction. The main body section 62 is arranged between the pair of side wall sections 43 of the base 40, and is guided in the front-rear direction, with its movement in the left-right direction being restricted by the pair of side wall sections 43.

The main body section 62 is formed in a frame shape. A front-side cutout groove 621 is formed in a front-side wall section, and a rear-side cutout groove 622 is formed in a rear-side wall section. The front-side cutout groove 621 and the rear-side cutout groove 622 are grooves through which an optical cable (e.g., indoor cable) can be passed. The front-side cutout groove 621 and the rear-side cutout groove 622 may also allow a portion of an optical-fiber retainer 10 (e.g., a rear section of the attachment 13 of the first optical-fiber retainer 10A illustrated in FIG. 1A, or the rod-shaped jig body 16 of the third optical-fiber retainer 10C) to be passed therethrough.

The main body section 62 is provided with a plurality of elastic pieces 623 constituting a pincher. The elastic pieces 623 are formed on respective inner sides of the left and right wall sections (side walls) of the main body section 62. The elastic pieces 623 are sections provided so as to project inwardly from respective inner surfaces of the left and right wall sections, and an optical cable (e.g., indoor cable) will be pinched between each pair of elastic pieces 623. Each pair of elastic pieces 623 may also pinch a portion of an optical-fiber retainer 10 (e.g., a rear section of the attachment 13 of the first optical-fiber retainer 10A illustrated in FIG. 1A, or the rod-shaped jig body 16 of the third optical-fiber retainer 10C). In this way, an optical-fiber retainer 10 can be directly or indirectly attached to the slider 60. Note that, in the following description, a member (e.g., an optical cable or a portion of an optical-fiber retainer 10) pinched between the pair (s) of elastic pieces 623 may be referred to as a "pinched member".

In this non-limiting example of one or more embodiments, the elastic piece 623 is formed as a thin plate, but the elastic piece may be shaped like a rod or a column. According to one or more embodiments, the dimension of the elastic piece 623 in the up-down direction is greater than the dimension of a pinched member (e.g., indoor cable) in the up-down direction. In this way, the pinched member is less likely to get displaced in the up-down direction.

Each of the elastic pieces 623 is arranged in an inclined manner with respect to the front-rear direction (the direction of the optical cable) such that a tip-end 623A of the elastic piece is located more toward the front side than a base-end 623B thereof. In this way, it is possible to permit a pinched member to move toward the front side with respect to the slider 60, but inhibit the pinched member from moving toward the rear side with respect to the slider 60.

The distance between respective tip-ends 623A of a pair of elastic pieces 623 is set narrower than the width (dimension in the left-right direction) of a pinched member. In this way, when a pinched member is arranged between the pair of elastic pieces 623, the elastic pieces 623 elastically deform and the pinched member is pinched by the restoring force of the elastic pieces 623. According to one or more embodiments, the tip-end 623A of each elastic piece 623 is rounded to suppress damaging of the pinched member.

A plurality of pairs of the elastic pieces 623 are formed on respective inner sides of the left and right wall sections of the main body section 62. The elastic pieces 623 on each of the left and right wall sections are arranged with spacings therebetween. In this way, force applied to the pinched member can be dispersed, and the pinched member can be retained stably. According to one or more embodiments, the elastic pieces 623 on the left and right wall sections are formed symmetrically. In this way, the pinched member can be inhibited from getting curved/bent.

Incidentally, when an already-bent optical cable is to be processed with an optical fiber processing tool (such as a fiber cutter or a cover-removal tool), the optical cable may get detached from the holder 20 due to the bend. By providing a pincher (in this non-limiting example of one or more embodiments, the plurality of pairs of the elastic pieces 623) to the slider 60 as in one or more embodiments, the optical cable (and the optical-fiber retainer 10) is less likely to get detached from the holder 20, thereby facilitating the processing work with the optical fiber processing tool.

Slider-side guide sections 624 are formed on respective outer surfaces of the left and right wall sections of the main body section 62. The slider-side guide sections 624 are sections projecting outwardly from the respective outer surfaces of the left and right wall sections of the main body section 62, and are sections guided in the front-rear direction by the guide grooves 431 in the respective side wall sections 43 of the base 40. The slider-side guide sections 624 are restrained in the up-down direction by the respective guide grooves 431 in the base 40, and thereby, the slider 60 is prevented from falling out upward.

A space between the front surface of the main body section 62 (i.e., the front-side surface of a wall section on the front side of the main body section 62) and the reference surface 42A of the base 40 constitutes a space for accommodating an optical-fiber retainer 10. Since the slider 60 is movable in the front-rear direction, the distance, in the front-rear direction, between the front-side wall section of the main body section 62 and the reference surface 42A of the base 40 can be adjusted, and thus, optical-fiber retainers 10 having various shapes can be attached in a positioned state.

The front-side extension sections 64 are sections extending toward the front side from respective left and right edges of the front-side wall section of the main body section 62. At least a portion of an optical-fiber retainer 10 will be arranged in an accommodation section 641 between the pair of front-side extension sections 64 lined up in the left-right direction. Since the front-side extension sections 64 are arranged on the left and right outer sides of the optical-fiber retainer 10, it is possible to suppress misalignment, in the left-right direction, of the optical-fiber retainer 10 attached to the holder 20.

The slider-side latch sections 66 are sections for retaining the position, in the front-rear direction, of the slider 60 with respect to the base 40, and are sections constituting the latch together with the base-side latch sections 432. Each slider-side latch section 66 includes a catch that is caught by one of the notches of the base-side latch section 432. It should be noted that it is possible to instead form the base-side latch section 432 in a claw-like shape and form a multitude of notches in the slider-side latch section 66, to retain the position, in the front-rear direction, of the slider 60 with respect to the base 40. Further, the latch is not limited to a structure in which a catch is caught by a notch.

{Method for Using Holder 20}

Figure 3A:
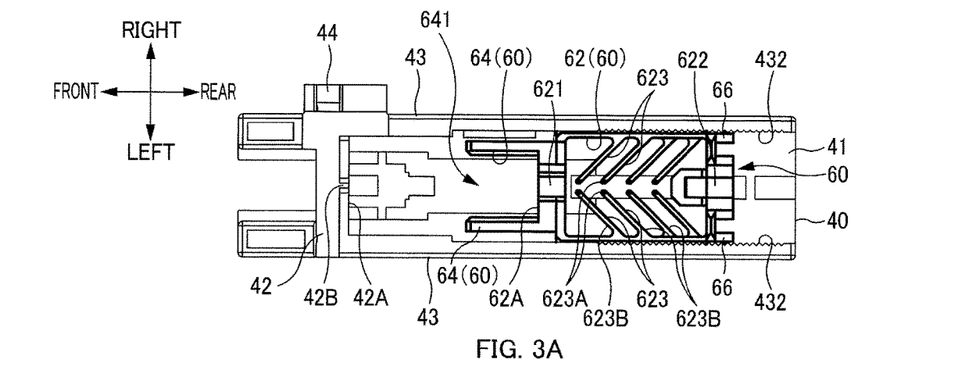
FIGS. 3A to 3C are diagrams illustrating states when the holder 20 of one or more embodiments is in use.
Figure 3B:
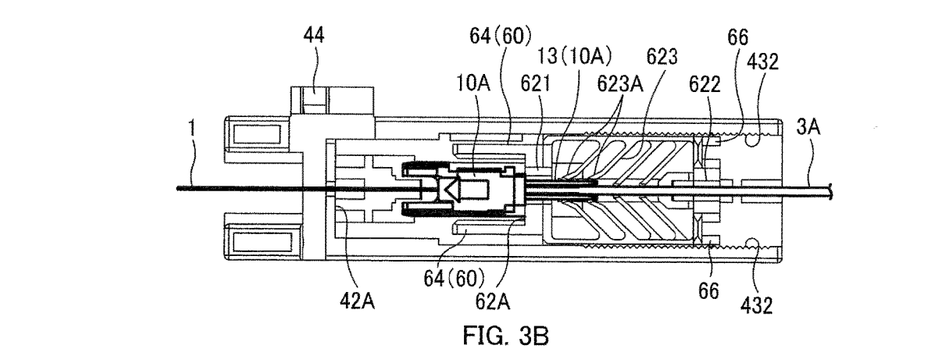
Figure 3C:
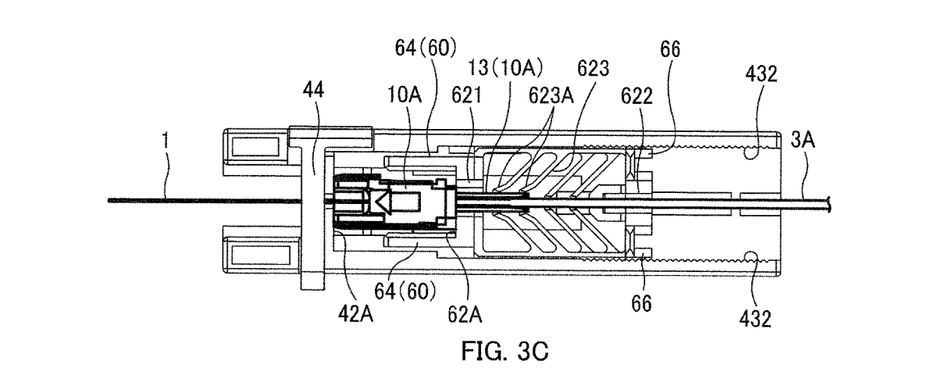

FIGS. 3A to 3C are diagrams illustrating states when the holder 20 of one or more embodiments is in use.

First, a worker prepares the holder 20 of one or more embodiments (see FIG. 3A). At this time, the worker moves the slider 60 toward the rear in advance so that the space between the slider 60 and the reference surface 42A of the base 40 is widened. Also, the fiber holding section 44 is opened.

Next, the worker attaches an optical-fiber retainer 10 to the slider 60 (see FIG. 3B). In cases of attaching a first optical-fiber retainer 10A gripping a round optical cable 3A via an attachment 13 (see FIG. 1A) to the slider 60, the first optical-fiber retainer 10A is attached to the slider 60 by: passing the attachment 13 (more specifically, the rear section of the attachment 13) through the front-side cutout groove 621 of the slider 60; passing the round optical cable 3A through the rear-side cutout groove 622 of the slider 60; and pinching the attachment 13 (more specifically, the rear section of the attachment 13) and the round cable with the elastic pieces 623. In cases where the first optical-fiber retainer 10A, which is an outer sheath gripping member, grips a square optical cable (e.g., indoor cable) without the intervention of an attachment 13, the first optical-fiber retainer 10A will be attached to the slider 60 by: passing the square optical cable through the front-side cutout groove 621 and the rear-side cutout groove 622 of the slider 60; and pinching the square optical cable with the elastic pieces 623. In this way, the worker attaches the optical-fiber retainer 10 to the slider 60 either directly or indirectly.

According to one or more embodiments, when attaching the optical-fiber retainer 10 to the slider 60, the optical-fiber retainer 10 is placed as much toward the rear (toward the slider 60 side) as possible, to an extent that a portion of the optical-fiber retainer 10 contacts the front surface of the main body section 62 (i.e., the front-side surface of the wall section on the front side of the main body section 62). If the optical-fiber retainer 10 is attached to the slider 60 in a state located closer to the front side, then, when the optical-fiber retainer 10 is made to abut against the reference surface 42A as will be described further below, the space between the front surface of the main body section 62 (i.e., the front-side surface of the wall section on the front side of the main body section 62) and the reference surface 42A of the base 40 will become wide, thus making the posture of the optical-fiber retainer 10 unstable.

In this non-limiting example of one or more embodiments, as illustrated in FIG. 3B, the optical-fiber retainer 10 is attached to the slider 60 in a state arranged between the pair of front-side extension sections 64 of the slider 60. In this way, it is possible to suppress misalignment, in the left-right direction, of the optical-fiber retainer 10. However, in cases where an optical-fiber retainer 10 that has a greater width than the distance between the pair of front-side extension sections 64 is to be attached to the slider 60, the optical-fiber retainer 10 may be arranged more toward the front side than the front-side extension sections 64. In this case, since the optical-fiber retainer 10 is wide, misalignment, in the left-right direction, of the optical-fiber retainer 10 can be inhibited by the respective inner surfaces of the side wall sections 43 of the base 40. Also, in this case and according to one or more embodiments, the optical-fiber retainer 10 is attached to the slider 60 by placing the optical-fiber retainer 10 as much toward the rear (toward the slider 60 side) as possible, so that the optical-fiber retainer 10 contacts the respective front edges of the front-side extension sections 64.

Next, the worker moves the slider 60 toward the front side in a state where the optical-fiber retainer 10 is attached to the slider 60, to cause the front edge of the optical-fiber retainer 10 to contact the reference surface 42A of the base 40 and thereby position the optical-fiber retainer 10 with respect to the reference surface 42A of the base 40. At this time, the distance between the reference surface 42A and the slider 60 to which the optical-fiber retainer 10 is attached decreases, and thus, the posture of the optical-fiber retainer 10 accommodated between the reference surface 42A and the slider 60 can be stabilized. Further, even when an optical-fiber retainer 10 with a different shape (particularly, a different dimension in the front-rear direction) is used, since the distance between the slider 60 and the reference surface 42A can be reduced in conformity with the optical-fiber retainer 10, the posture of the optical-fiber retainer 10 can be stabilized.

The holder 20 of one or more embodiments includes a latch (the base-side latch sections 432 and the slider-side latch sections 66) that retains the position of the slider 60 with respect to the base 40. Thus, after causing the front edge of the optical-fiber retainer 10 to contact the reference surface 42A of the base 40, the position of the slider 60 can be retained, thereby making it possible to maintain a state in which the optical-fiber retainer 10 is positioned with respect to the reference surface 42A of the base 40. If the slider 60 moves rearward after having the front edge of the optical-fiber retainer 10 contact the reference surface 42A of the base 40, then the optical-fiber retainer 10 will separate from the reference surface 42A of the base 40; thus, when the holder 20 is set to an optical fiber processing tool to process the optical fiber 1, an error may occur in the projection length of the optical fiber 1 (insertion fiber) projecting from the optical-fiber retainer 10 and also in the cover-removal length. With the holder 20 of one or more embodiments, such an error can be suppressed.

Further, in the holder 20 of one or more embodiments, the catch of the slider-side latch section 66 is caught by one of the notches in the base-side latch section 432. Thus, the position, in the front-rear direction, of the slider 60 with respect to the base 40 can be retained firmly. Thus, in one or more embodiments, after the front edge of the optical-fiber retainer 10 contacts the reference surface 42A of the base 40, the slider 60 is less likely to be displaced rearward.

Incidentally, since the position of the slider 60 is retained by the catch getting caught by one of the notches that are arranged continuously in the front-rear direction, the position of the slider 60 retained by the latch becomes discrete. Thus, when the front edge of the optical-fiber retainer 10 comes into contact with the reference surface 42A of the base 40, if the catch of each slider-side latch section 66 is in the middle of moving over a slope section of the notch, the slider 60 may get displaced rearward by half a pitch of the notch when the worker releases his/her hand from the slider 60.

According to one or more embodiments, when the worker once releases his/her hand from the slider 60 after moving the slider 60 toward the front and bringing the front edge of the optical-fiber retainer 10 into contact with the reference surface 42A of the base 40, the worker further moves the optical-fiber retainer 10 toward the front with respect to the slider 60, so that the front edge of the optical-fiber retainer 10 comes into contact with the reference surface 42A of the base 40 again. In one or more embodiments, the pincher (elastic pieces 623) of the slider 60 is constructed so as to permit a pinched member to move toward the front side (the reference surface 42A side) but inhibit the pinched member from moving toward the rear side. Thus, the optical-fiber retainer 10 can be moved toward the front with respect to the slider 60—without moving the slider 60—to make the optical-fiber retainer 10 contact the reference surface 42A again, and also, this state—in which the front edge of the optical-fiber retainer 10 is again in contact with the reference surface 42A of the base 40—can be maintained.

Finally, the worker closes the fiber holding section 44 to hold the optical fiber 1 extending out from the front side of the optical-fiber retainer 10. In this way, movement of the optical fiber 1 is restricted. Then, the worker sets, to an optical fiber processing tool, the holder 20 to which the optical-fiber retainer 10 has been attached.

Figure 4:
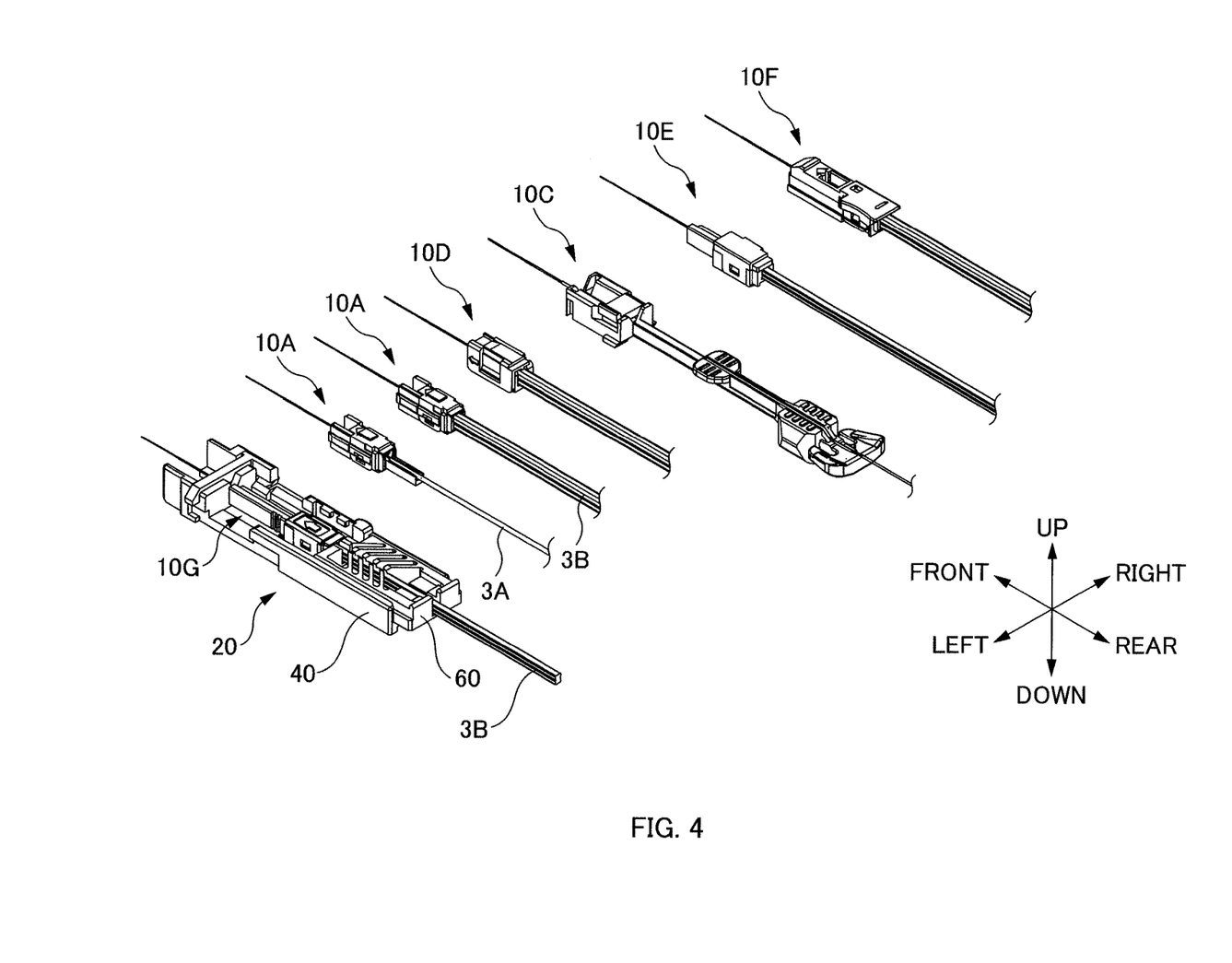
FIG. 4 is a diagram illustrating a state in which an optical-fiber retainer 10G has been attached to a holder 20 according to one or more embodiments.

FIG. 4 is a diagram illustrating a state in which an optical-fiber retainer 10G has been attached to a holder 20 according to one or more embodiments. The figure also illustrates a plurality of types of optical-fiber retainers 10

(10A and 10C to 10G) that can be attached to the holder 20 of one or more embodiments. The holder 20 of one or more embodiments is also constructed such that optical-fiber retainers having various shapes can be attached thereto.

Figure 5:
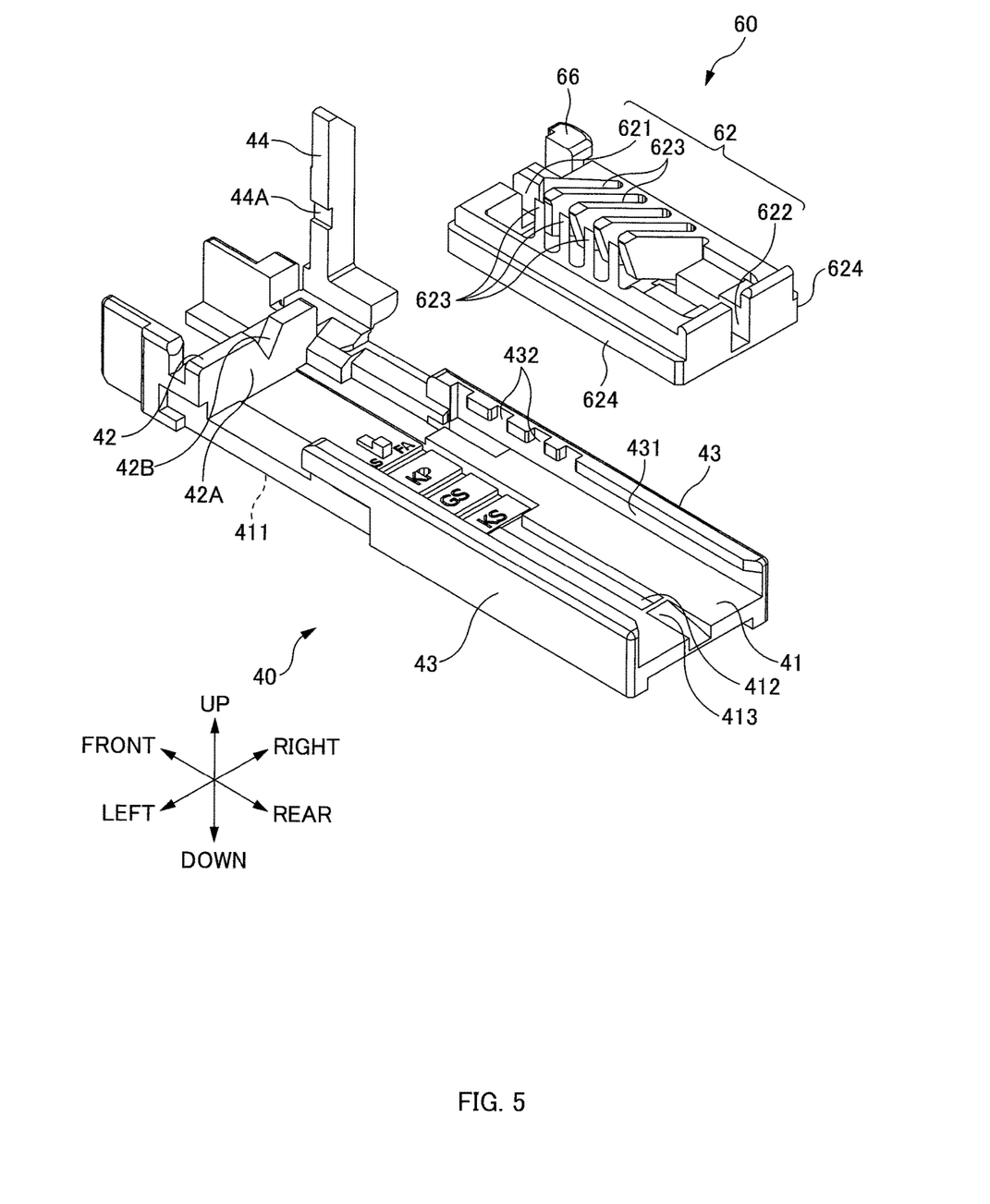
FIG. 5 is an exploded perspective view of the holder 20 of one or more embodiments.
Figure 6A:
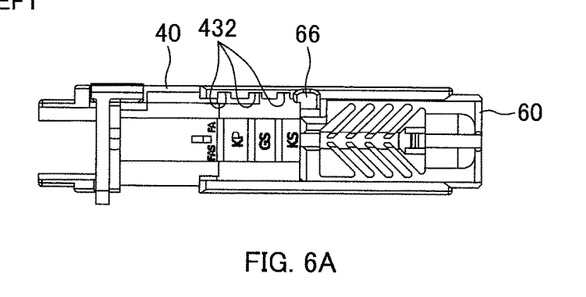
FIGS. 6A to 6C are diagrams illustrating states when the holder 20 of one or more embodiments is in use.
Figure 6B:
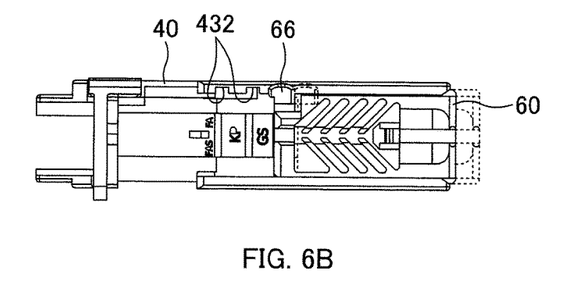
Figure 6C:
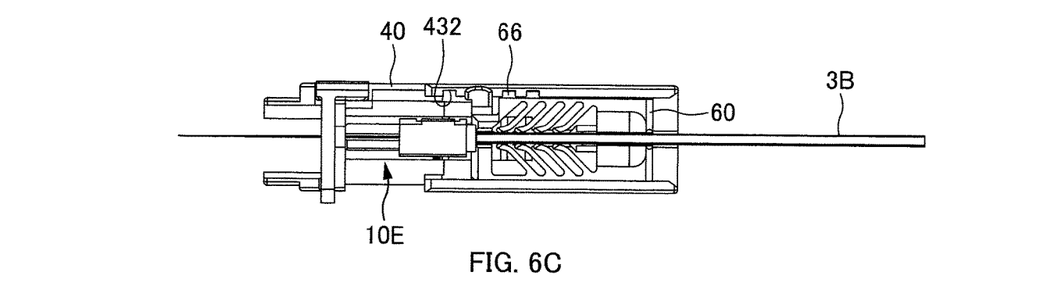

FIG. 5 is an exploded perspective view of the holder 20 of one or more embodiments. FIGS. 6A to 6C are diagrams illustrating states when the holder 20 of one or more embodiments is in use. In one or more embodiments, the holder 20 includes a base 40 and a slider 60.

In one or more embodiments, the base 40 includes a bottom section 41, a front wall section 42, and a pair of side wall sections 43. An optical-fiber retainer 10 (or a portion of an optical-fiber retainer 10) and the slider 60 will be accommodated in a space surrounded by the bottom section 41, the front wall section 42, and the pair of side wall sections 43. The bottom section 41 is provided with a guide groove 412 and an engagement section 413. A surface on the rear side of the front wall section 42 serves as a reference surface 42A. An upper edge section of the front wall section 42 is provided with a fiber groove 42B. In the inner surface of each side wall section 43, a guide groove 431 is formed along the front-rear direction. The base 40 further includes a fiber holding section 44. A groove 44A is formed in the fiber holding section 44.

In one or more embodiments, the side wall section 43 has a base-side latch section 432. The base-side latch section 432 in one or more embodiments is constituted by four notches (cutouts) lined up along the front-rear direction.

In one or more embodiments, the slider 60 includes a main body section 62. The main body section 62 is formed in a frame shape. A front-side cutout groove 621 is formed in a front-side wall section, and a rear-side cutout groove 622 is formed in a rear-side wall section. The main body section 62 is also provided with a plurality of elastic pieces 623 constituting a pincher.

In one or more embodiments, the slider 60 includes a slider-side latch section 66. The slider-side latch section 66 of one or more embodiments includes a catch that is caught by one of the notches of the base-side latch section 432. In one or more embodiments, the slider-side latch section 66 can elastically deform, and thereby, the position of the catch (the section caught by the notch of the base-side latch section 432) of the slider-side latch section 66 can be shifted leftward with respect to the main body section 62. In this way, a worker can elastically deform the slider-side latch section 66, and thereby, it is possible to release a state (latched state) in which the slider-side latch section 66 is caught by the base-side latch section 432. As described above, the slider-side latch section 66 of one or more embodiments includes a latch release for releasing the latched state. By providing the holder 20 with a latch release for releasing a latched state created by the latch as in one or more embodiments, the position of the slider 60 with respect to the base 40 becomes adjustable, even when the latch mechanism firmly retains the position of the slider 60 with respect to the base 40. It should be noted that the latch release of the slider-side latch section 66 is not limited to a mechanism in which a catch is detached from a notch in the base-side latch section 432 by elastic deformation, but it may be any mechanism capable of releasing the latched state.

In one or more embodiments, the base-side latch section 432 includes a multitude of notches, and it is possible to position the slider 60 to a discretionary position with respect to the base 40. In contrast, in one or more embodiments, there are only four notches in the base-side latch section 432. Thus, in one or more embodiments, the slider 60 can only be adjusted to four positions with respect to the base 40. It is, however, permissible to have only a small number of adjustable positions in cases where the types of optical-fiber retainers 10 to be set to the holder 20 are limited. Particularly, it is permissible to have only a small number of adjustable positions in circumstances where the shapes of the optical-fiber retainers 10 are standardized.

Further, in one or more embodiments, since the number of notches in the base-side latch section 432 is smaller compared to that in one or more embodiments, the depth of each notch (cutout) can be formed deeper. In this way, one or more embodiments can more firmly retain the position of the slider 60 in the front-rear direction with respect to the base 40 compared to one or more embodiments, thereby being advantageous in that the position of the slider 60 is less likely to get displaced.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber;
3A: Round optical cable;
3B: Square optical cable;
10: Optical-fiber retainer (10A to 100: First to third optical-fiber retainers);
11: Main body section;
12: Lid;
13: Attachment;
14: Rear section;
15: Front section;
16: Jig body;
17: Fiber holding section;
18: Slider;
20: Holder;
40: Base;
41: Bottom section;
411: Bottom surface;
412: Guide groove;
413: Engagement section;
42: Front wall section;
42A: Reference surface;
42B: Fiber groove;
43: Side wall section;
431: Guide groove;
432: Base-side latch section;
44: Fiber holding section;
44A: Groove;
60: Slider;
62: Main body section;
621: Front-side cutout groove;
622: Rear-side cutout groove;
623: Elastic piece;
623A: Tip-end;
623B: Base-end;
624: Slider-side guide section;
64: Front-side extension section;
641: Accommodation section;
66: Slider-side latch section.

The invention claimed is:
1. A holder comprising:
a base including a reference surface; and a slider movable in a front-rear direction with respect to the base, wherein at least a portion of an optical-fiber retainer is accommodated between the reference surface and the slider when the optical-fiber retainer that retains an optical-fiber is attached to the slider and is positioned with respect to the reference surface by moving the slider toward a reference surface side, the slider includes a pincher, the pincher includes a pair of elastic pieces that project inwardly from a pair of respective inner surfaces of a pair of side walls, and each of the elastic pieces is inclined such that a tip-end of the elastic piece is located more toward the reference surface side than a base-end thereof.

2. The holder according to claim 1, further comprising a latch that retains a position of the slider with respect to the base.

3. A holder comprising:

a base including a reference surface;

a slider movable in a front-rear direction with respect to the base; and a latch that retains a position of the slider with respect to the base; wherein at least a portion of an optical-fiber retainer is accommodated between the reference surface and the slider when the optical-fiber retainer that retains an optical-fiber is attached to the slider and is positioned with respect to the reference surface by moving the slider toward a reference surface side, the latch includes a base-side latch section provided to the base and a slider-side latch section provided to the slider, one of the base-side latch section and the slider-side latch section includes a plurality of notches lined up in the front-rear direction, and the other includes a catch, and the catch is caught by one of the notches to retain the position of the slider in the front-rear direction with respect to the base.

4. The holder according to claim 3, wherein the slider includes a pincher, and a pinched member that is pinched by the pincher is movable toward the reference surface side but is inhibited from moving toward an opposite side.

5. The holder according to claim 4, wherein the pincher includes a pair of elastic pieces that project inwardly from a pair of respective inner surfaces of a pair of side walls, and each of the elastic pieces is inclined such that a tip-end of the elastic piece is located more toward the reference surface side than a base-end thereof.

6. The holder according to claim 5, wherein the pincher includes a plurality of pairs of the elastic pieces.

7. The holder according to claim 2, further comprising a latch release that releases a latched state created by the latch.

8. An optical fiber processing method comprising:

preparing a holder that comprises a base including a reference surface, and a slider that is movable in a front-rear direction with respect to the base, wherein the slider includes a pincher, the pincher includes a pair of elastic pieces that project inwardly from a pair of respective inner surfaces of a pair of side walls, each of the elastic pieces is inclined such that a tip-end of the elastic piece is located more toward the reference surface side than a base-end thereof;

attaching, to the slider, an optical-fiber retainer that retains an optical fiber;

moving the slider toward the reference surface side when the optical-fiber retainer is attached to the slider to position the optical-fiber retainer with respect to the reference surface;

setting, to an optical fiber processing tool, the holder that accommodates at least a portion of the optical-fiber retainer between the reference surface and the slider; and processing the optical fiber.

9. An optical fiber processing method comprising:

preparing a holder that comprises a base including a reference surface, a slider that is movable in a front-rear direction with respect to the base, and a latch that retains a position of the slider with respect to the base;

attaching, to the slider, an optical-fiber retainer that retains an optical fiber;

moving the slider toward the reference surface side when the optical-fiber retainer is attached to the slider to position the optical-fiber retainer with respect to the reference surface;

setting, to an optical fiber processing tool, the holder that accommodates at least a portion of the optical-fiber retainer between the reference surface and the slider; and processing the optical fiber, wherein the latch includes a base-side latch section provided to the base and a slider-side latch section provided to the slider, one of the base-side latch section and the slider-side latch section includes a plurality of notches lined up in the front-rear direction, and the other includes a catch, and the catch is caught by one of the notches to retain the position of the slider in the front-rear direction with respect to the base.

* * * * *